June 26, 1928.  1,675,284
A. J. VANCE
DRIER FOR SHEET MATERIAL
Filed July 14, 1924  3 Sheets-Sheet 2

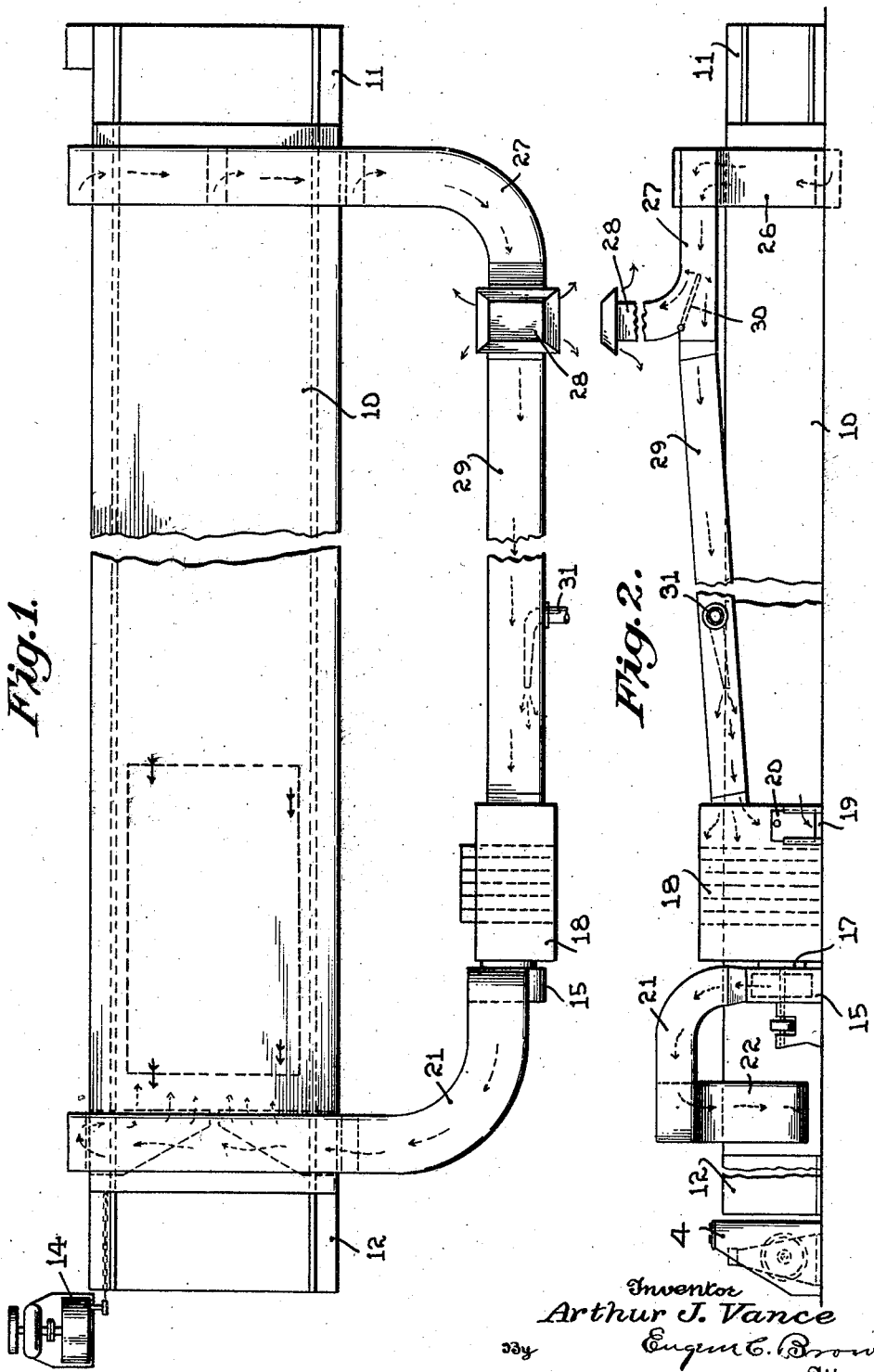

Inventor
Arthur J. Vance
Eugene C. Brown
Attorney

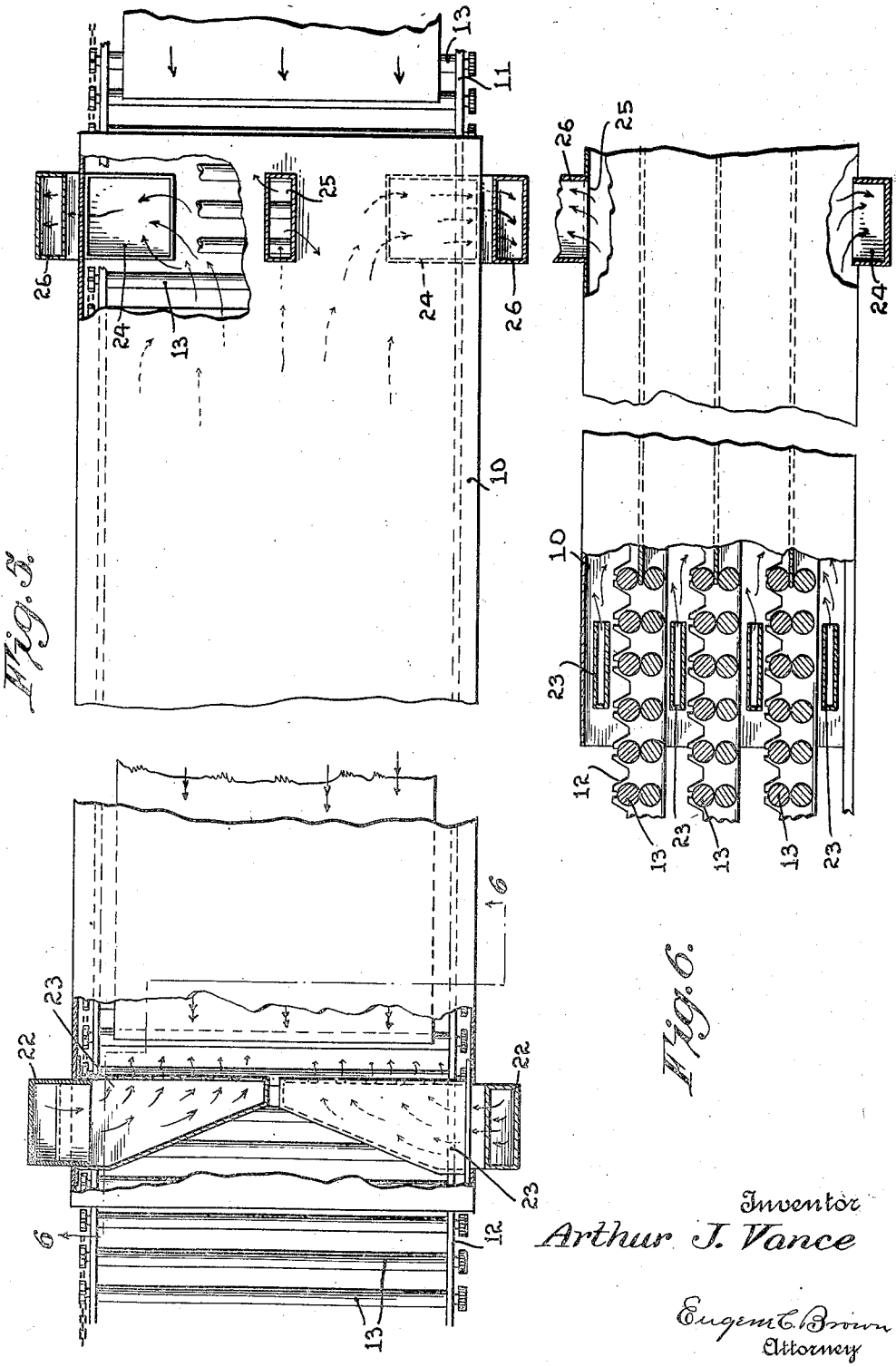

Patented June 26, 1928.

1,675,284

UNITED STATES PATENT OFFICE.

ARTHUR J. VANCE, OF PAINESVILLE, OHIO, ASSIGNOR TO THE COE MANUFACTURING COMPANY, OF PAINESVILLE, OHIO, A CORPORATION OF OHIO.

DRIER FOR SHEET MATERIAL.

Application filed July 14, 1924. Serial No. 725,922.

This invention relates to driers of the progressive type wherein the material to be dried is passed gradually through a long drying chamber in which it is subjected to the action of a circulating drying medium such as moist or dry air, heat being also employed in the drying process.

More particularly the invention relates to the control of the circulation of the drying medium, the provision and regulation of moisture in the same and economic control of the heating thereof.

The invention consists particularly in simplifying the manner in which the flow of the circulating medium through veneer driers is controlled, and in improving the manner in which steam is introduced for supplying moisture, these improvements effecting important economies in operation and tending to greater ease and effectiveness of operation.

A typical form of the invention will now be described and specifically claimed, reference being had to the accompanying drawings wherein:

Figure 1 is a general outline plan view of a drier constructed in accordance with this invention.

Figure 2 is a side elevation thereof.

Figure 5 is an enlarged detail plan view partly in section to show the inlet nozzles and the arrangement of the exhausts.

Figure 6 is a detail side view partly in section to show the veneer carrying rolls.

Figure 3:
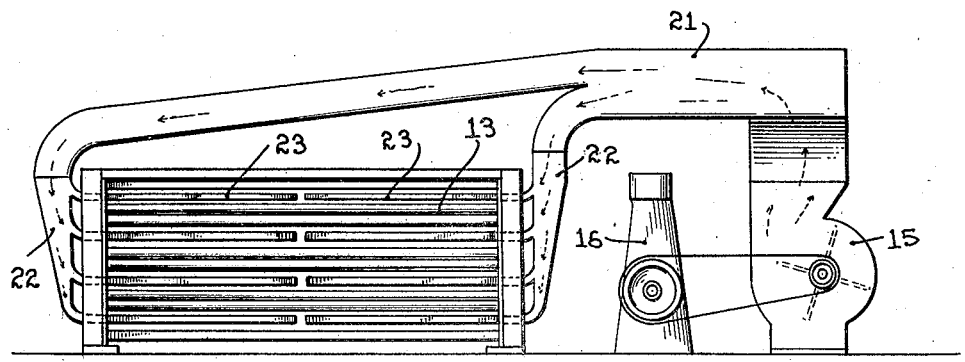
Figure 3 is an end view thereof.
Figure 4:
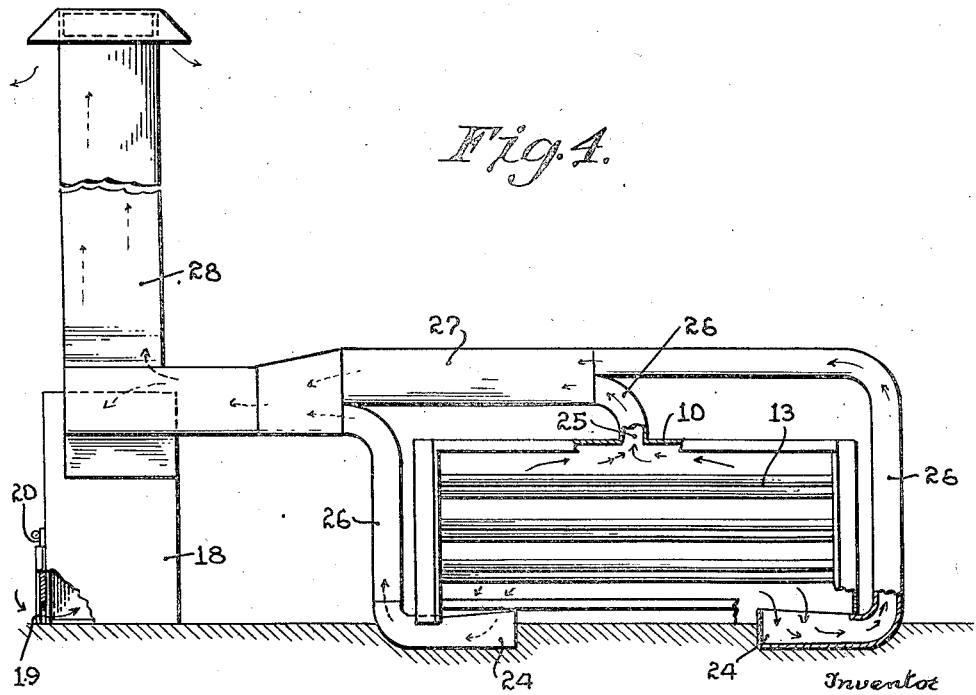
Figure 4 is a view from the opposite end, the view being partly in section to show the outflow of the air.

In the device herein illustrated there is shown a drier having a long drying chamber 10 forming the main portion of the device and at one end thereof there is provided what may be termed a feeding or supply chamber 11 while the other end is provided with an extension 12 forming a cooling chamber.

Within the drying chamber and extending outwardly into the feeder are sets of feeder rolls 13 which are driven by a suitable engine indicated at 14, the driving connections not being shown as forming no part of the invention. These rolls serve to feed the veneer, wall board or the like from the feeder through the drying chamber to the cooler as shown by the double headed arrows in Figures 1 and 5, the air currents being indicated by single headed arrows.

At one side of the drying chamber is located a circulating fan or blower 15 which is driven by a suitable engine 16. The intake 17 of this fan is connected to a heating chamber 18 which is provided with a fresh air inlet 19 controlled by a gate 20. The outlet or delivery end of this fan is connected by a delivery pipe 21 with down flow pipes 22 arranged at the sides of the drying chamber at the end adjacent the cooler, these down flow pipes being connected to the air delivery nozzles 23 located between respective rows of feeding rollers. At the opposite or feeder end of the drying chamber there is provided in the floor a pair of outlets 24 and centrally of the top is a third outlet 25, these outlets being connected by uptakes 26 to a header or outflow pipe 27 leading to an exhaust stack 28. Extending from the stack to the heater 18 is a by-pass or recirculating pipe 29 which forms a continuation of the pipe 27, a leaf valve 30 being provided at the junction with the stack so that air flowing through the pipe 27 may be directed either into the stack or the by-pass or may be directed partly into one and partly into the other as may be found desirable under the conditions found requisite to the proper drying of the particular material being treated in the drier.

For the purpose of providing a proper moisture content to the air passing through the system a steam admission nozzle 31 is introduced in the system at some point in either the by-pass 29 or the pipe 21, the steam or moisture being thus introduced between the stack and the inlet nozzles.

In the operation of the device it will be seen that the drying medium (the air) travels through the drying chamber in a direction opposite the material being dried. With certain material it is found that the moisture content is so quickly evaporated that the air, even when hot, becomes saturated by the time it passes through the drier once. Under such conditions the valve 30 is turned to cause all the exhaust air from the drying chamber to pass up the stack and the gate 20 is fully opened to afford a plentiful supply of fresh air. Under other conditions the moisture is given off so slowly that the moisture content of the air is far below the saturation point. To discharge such air into the atmosphere would waste a large amount of heat but by adjusting the valve 30 and the gate 20 the discharge of this air may be so regulated that only enough fresh air is admitted and only enough used air exhausted to make up for the loss of absorptive capacity in the air after its passage through the drier, the greater portion of the air being recirculated. Under still other conditions it is desirable to treat the material in the drier with moist air without introducing fresh air and this may be accomplished by closing of the stack by the valve 30 and also closing the gate 20, moisture being admitted as desired through the nozzle 31. It will be seen that all this is accomplished by the use of a single fan or blower and only two valves or dampers, a recirculating damper or valve at the base of the stack and an inlet valve or gate. Furthermore the use of this apparatus permits reconditioning the air by reheating the humidified air thus reducing its relative humidity when referred to the point of saturation since by increasing the temperature of the air its capacity for absorbing moisture is also increased. The device thus forms an automatic, progressive humidifying system.

Having thus described the invention, what is claimed as new, is:—

1. The combination with a drying chamber having a supply end and a delivery end; of perforated nozzles located at the delivery end of the drying chamber and extending substantially thereacross, a heating chamber to supply heated air to said nozzles, means to draw off air from the supply end of the drying chamber, including an exhaust stack, a recirculating pipe connecting the bottom of the stack with the air supply means, and a single valve at the junction of the pipe and stack for selectively controlling the proportions of air flowing through the pipe and stack.

2. The combination with a drying chamber having a supply end and a delivery end; of perforated nozzles located at the delivery end of the drying chamber and extending substantially thereacross, a heating chamber to supply heated air to said nozzles, means to draw off air from the supply end of the drying chamber, including an exhaust stack, a recirculating pipe connecting the bottom of the stack with said heating chamber, a single valve at the junction of the pipe and stack for selectively controlling the proportions of air flowing through the pipe and stack, and a single valve connected with the heating chamber to control the supply of fresh air thereto.

3. The combination with a drying chamber having a supply end and a delivery end; of an air circulating fan, an air heating chamber connected to the fan, valved means to permit the supply of fresh air to the heating chamber and fan, perforated nozzles located at the delivery end of the drying chamber and extending substantially thereacross, an air supply pipe leading from the fan to said nozzles, air exhaust means at the feeding end of the drying chamber and including an exhaust stack, a recirculating pipe connecting the bottom of the stack with the heating chamber and fan, and a single two-way valve at the junction of the pipe and stack for controlling the relative proportions of air flowing through the stack and recirculating pipe.

4. In an automatic progressive humidifying system of the class described, the combination with a drying chamber having a supply end and a delivery end; of perforated nozzles located at the delivery end of the drying chamber and extending substantially thereacross, a heating chamber to supply heated air to said nozzles, means to draw off air from the supply end of the drying chamber, including an exhaust stack, a recirculating pipe connecting the bottom of the stack with the air supply means, a single valve at the junction of the pipe and stack for selectively controlling the proportions of air flowing through the pipe and stack, and a steam supply entering the system between the stack and the heating chamber.

5. In an automatic progressive humidifying system of the class described, the combination with a drying chamber having a supply end and a delivery end; of perforated nozzles located at the delivery end of the drying chamber and extending substantially thereacross, a heating chamber to supply heated air to said nozzles, means to draw off air from the supply end of the chamber, including an exhaust stack, a recirculating pipe connecting the bottom of the stack with the heating chamber, a single valve at the junction of the pipe and stack for selectively controlling the proportions of air flowing through the pipe and stack, a single valve connected with the heating chamber controlling the supply of fresh air thereto, and a steam supply entering the system between the stack and the nozzles.

6. In an automatic progressive humidifying system of the class described, the combination with a drying chamber having a supply end and a delivery end; of an air circulating fan, an air heating chamber connected to the fan, valved means to permit the supply of fresh air to the heating chamber and fan, perforated nozzles located at the delivery end of the drying chamber and extending substantially thereacross, an air supply pipe leading from the fan to said nozzles, air exhaust means at the feeding end of the drying chamber and including an exhaust stack, a recirculating pipe connecting the bottom of the stack with the heating chamber and fan, a single two-way valve at the junction of the pipe and stack for controlling the relative proportions of air flowing through the stack and recirculating pipe, and a steam supply entering the system between the stack and the nozzles.

In testimony whereof I affix my signature.

ARTHUR J. VANCE.